United States Patent [19]
Marriott et al.

[11] Patent Number: 5,329,956
[45] Date of Patent: Jul. 19, 1994

[54] PNEUMATIC OPERATED VALVE STROKE TIMING

[75] Inventors: William D. Marriott, Ellington; Winslow K. Duff; Francis X. McDonald, both of Enfield, all of Conn.

[73] Assignee: Combustion Engineering, Inc., Windsor, Conn.

[21] Appl. No.: 68,741

[22] Filed: May 28, 1993

[51] Int. Cl.$^5$ .............................................. F16K 37/00
[52] U.S. Cl. .................................... 137/15; 137/552; 137/554; 137/557; 251/30.01; 73/168
[58] Field of Search .................. 137/1, 552.7, 554, 557, 137/552, 15; 251/30.01; 73/168

[56] References Cited

U.S. PATENT DOCUMENTS

| | | | |
|---|---|---|---|
| 4,059,960 | 11/1977 | Osborne | 137/554 X |
| 4,523,286 | 6/1985 | Koga et al. | 137/554 X |
| 4,617,960 | 10/1986 | More | 137/554 |
| 4,712,071 | 12/1987 | Charbonneau et al. | 137/554 X |
| 5,193,568 | 3/1993 | Eissenberg et al. | 137/1 |

Primary Examiner—John Rivell
Attorney, Agent, or Firm—L. James Ristas; John H. Mulholland

[57] ABSTRACT

A non-intrusive method for timing the full operational motion of a valve plug (26) in an electrically actuated, pneumatically operated valve (10). An actuation signal is sent to the valve actuator (54). A coil of wire (68) around the valve actuator solenoid (56), an accelerometer (70) on the solenoid slug (64), or a connection to a permanent pressure sensor (72), non-intrusively senses arrival of the actuation signal at the valve. The time measuring equipment (12) begins timing when the actuation signal is sensed. A laser valve motion sensor (74) then non-intrusively senses when the valve plug reaches a limit of motion. The time measuring equipment ends timing when the valve plug reaches a limit of motion. The time measuring equipment then records the elapsed time from the sensing of the arrival of actuation signal to the final limit of motion of the valve plug.

12 Claims, 2 Drawing Sheets

PNEUMATIC OPERATED VALVE STROKE TIMING

BACKGROUND OF THE INVENTION

The present invention is directed to non-intrusively measuring the time for the full stroke operation of a pneumatically controlled valve, and more particularly, to measuring the time interval for an electrically actuated, pneumatically controlled valve to fully open or close in a nuclear facility.

Pneumatically controlled valves are used extensively in nuclear power generating plants. The time interval for individual valves to open or close is very important for many safety aspects of nuclear plant operation. Valves need to fully operate within set parameters to ensure that safety regulations are being met. To date the timing of valves has been accomplished by hand held stop watches and technicians in different locations communicating by phone. One technician will start the valve closing or opening sequence from the control room while another technician observes the valve operation and performs the timing by hand. Other methods include observing indicator lights which may or may not be properly set up or functioning.

There are many disadvantages to the present methods of timing valves. In both cases, observation of the valve per se or observation of the indicator lights, there is the human variable of when the timing begins and ends. Not only can the timing be inaccurate, but because of variations in the human hand and eye between individuals and even between the same individual from day to day, the degree of inaccuracy will be inconsistent. Thus, it can be difficult to accurately identify valve degradation over a period of months or years by comparing valve timings. Also in cases where the timing is performed by actually observing the valve start and stop, there is no accurate compensation for the time elapsed for the operation of the pneumatic control mechanism.

At present there are methods available for testing valve operation in the plant. Use of such methods, however, would require disconnecting the valve control mechanism from the control room. A signal would be generated from the test equipment to cause valve actuation. Timing could then be performed from various test sights on the valve. This method of valve testing is unacceptable for safety testing the operation of valves in many nuclear power plants. The valve needs to perform in the same environment and situation it would need to perform in if an actual emergency were to occur. The disconnection and then reconnection of safety related signal and/or control lines presents licensing problems.

SUMMARY OF THE INVENTION

The present invention non-intrusively measures the timing operation of a pneumatically controlled valve. The valve is allowed to function with the normal controls of the valve. The invention passively measures indications of the arrival of the electrical activation signal from the control room and begins timing. The invention then non-intrusively measures the physical movement of the valve and ends timing when the valve has fully closed or opened. The invention can very accurately measure the timing of the closing or opening of the valve from the arrival of the signal at the valve control mechanism from the control room, to the full closing or opening of the valve. The accurate timing can be saved and compared to later test data to observe if degradation of the valve has occurred over time.

The indications of the arrival of the activation signal from the control room can be measured in several ways. In a valve control mechanism an electrical signal is converted to an air pressure. The electrical signal from the control room operates a solenoid which in turn admits air to the valve operator. A coil can be placed around the solenoid housing to measure the change in the electrical field that occurs in the solenoid when the electrical actuation signal arrives. This is particularly useful when the solenoid is operated by a large alternating current. Alternatively, an accelerometer can be placed on the solenoid to measure the vibrations due to movement of the solenoid mechanism. In some control mechanisms, the actuation signal from the control room is a direct current signal. The induced voltage from the increase or decrease of the direct current can be measured. Some valve control mechanisms have a permanent pressure sensor attached between the valve control mechanism and the pneumatically controlled valve. A measurement of the increase or decrease in air pressure can indicate arrival of the activation signal, and therefore can be used to begin the timing of the valve operation. For timing of the valve, only a single method mentioned need be used to indicate arrival of the actuation signal at the actuator.

The movement of the valve can be directly measured. To be non-intrusive, a method of measuring valve motion must not significantly increase the forces on the valve stem. Significant increases in forces on the valve stem would effect valve timing. One method of measuring the position of the valve is to place a sensor on the valve stem, then mechanically measure the position of the valve stem and therefore the valve plug. Another method can be the use of a laser valve position indicator. The laser measuring device includes a laser head and a reflective surface. The laser head or reflective surface is attached to the valve yoke or body and the other component is attached to the valve stem. The laser and associated signal processing equipment can then very accurately measure the position of the valve and indicate when the valve plug has reached a limit of motion. The valve plug includes any means for blocking the flow of a fluid through a passage, such as a gate, a cock, etc. The laser measuring device has low mass and so does not add significant forces when attached to the valve stem, therefor not effecting valve timing.

The timing device measures digitally or by analog means, the time between two signals generated by the test equipment and records the information for the technician operating the equipment.

In the best mode a coil of wire is wrapped around the alternating current controlled solenoid in the valve control mechanism, and in combination with the laser valve position measuring device. The laser measuring device is disclosed in U.S. patent application Ser. No. 924,371, filed on Jul. 31, 1992, now U.S. Pat. No. 5,231,469 issued Jul. 27, 1993 the disclosure which is incorporated by reference. Loops of wire are wrapped around the solenoid housing to indicate the arrival of the signal and the laser head and reflector are clipped to the valve body and the valve stem. In a direct current controlled valve control mechanism, the induced voltage would be measured, but in a digital recording system a condenser may be required to hold the voltage spike long enough for the system to record the signal.

This would also be combined with the laser valve position sensor. The advantage of this system is that it measures the longest possible time, from the arrival of the actual signal from the control room to the final opening or closing of the valve. It is also the least intrusive method because of the very limited physical attachment of the test equipment to the valve and valve control mechanism. Another advantage is the speed of being able to quickly attach and detach the test equipment from the valve, facilitating the testing of many valves in a short period of time.

An accelerometer can measure as an indication of the arrival of the signal from the control room by the movement of the solenoid slug. However, there can be a delay between the arrival of the signal and the start of actual movement of the solenoid slug, leading to errors in time measurement. One advantage of such a method of measurement is that the accelerometer can be very easily temporarily attached to the solenoid by a magnet on the accelerometer. The accelerometer senses the vibration of the solenoid slug moving in the solenoid. Such timing errors are further increased if the measurement of the signal arriving from the control room is indicated from a permanent pressure sensor between the valve control mechanism and the pneumatic valve.

The timing system can also be used as a diagnostic tool for the valve. Time measurements can be taken from the coil on the solenoid, the accelerometer, the pressure sensor between the control valve mechanism and the pneumatic valve and the valve position sensor. By comparing the times between each sensor reading, a technician can determine not only whether the valve timing is increasing, but what component may be causing the increase. If the cause of an increase in valve operation time can be narrowed to one or two components of the valve system, less time and costs need be incurred in repair of the valve.

In the preferred embodiment, a technician would have the invention on a rolling cart. The technician would wrap wire around the solenoid of the actuator and attach the wire to the timing equipment. Next the technician would attach the laser measuring equipment to the valve by securing the laser head to the valve body and clipping the reflective surface to the valve stem. Then the technician would "zero" the laser measuring equipment. A plant operator in the control room would then send an activation signal to the valve actuator. The current in the solenoid would induce a current in the coil indicating arrival of the activation signal. The timing equipment would process the signal from the coil and begin timing. When the laser measuring device indicated that the valve had reached the limit of motion, the timing equipment would process the information from the laser measuring device and stop timing. The timing information would then be recorded by the timing equipment. Finally the technician would remove the coil and laser measuring device from the valve.

BRIEF DESCRIPTION OF THE DRAWINGS

These and other objects and advantages of the invention will be described below in connection with the preferred embodiment of the invention and with reference to the accompanying drawings, in which.

DESCRIPTION OF THE PREFERRED EMBODIMENT

Figure 1:
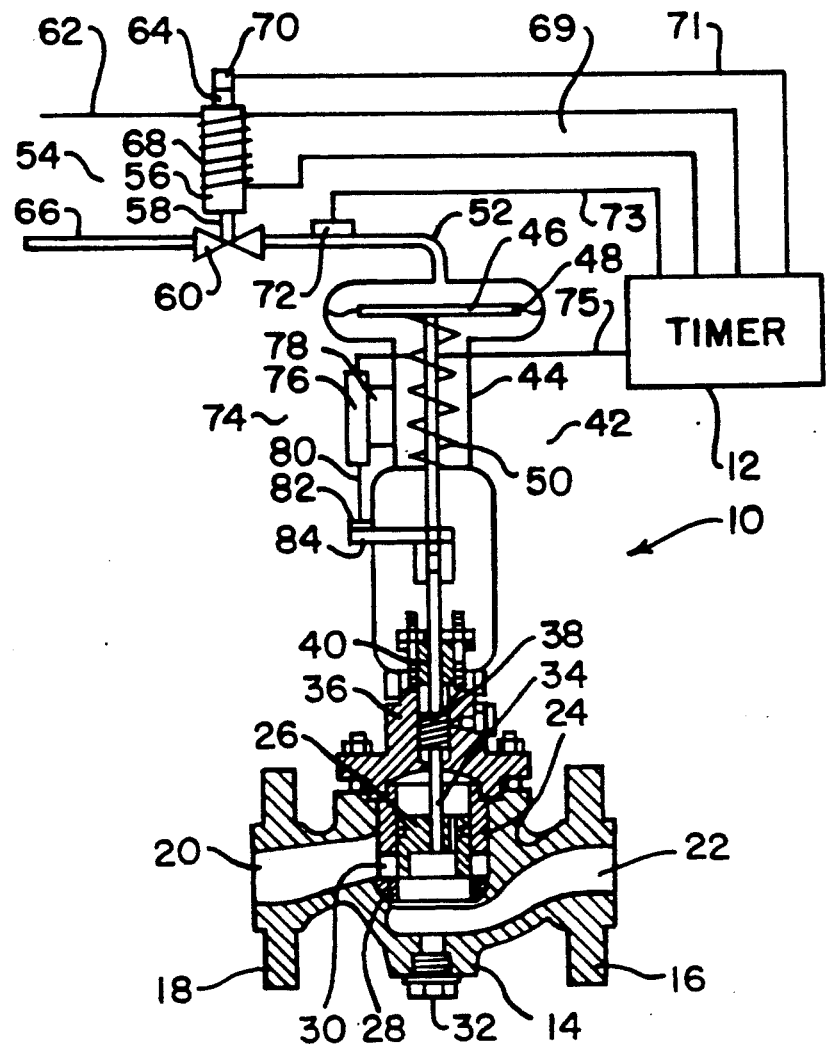
FIG. 1 is a side view partially in section of the timing device attached to a two position valve in accordance with the invention.

FIG. 1 shows a two position valve 10 with the timing mechanism 12. The valve has a main body 14 with two flanges 16 and 18 for attachment into a fluid piping system not shown. The main body 14 has passages 20 and 22 for fluid to flow through the valve. Inside the main body 14 is sleeve 24 in which the plug 26 slides. When the plug 26 is at the down limit position as shown, the plug rests against seat 28 forming a fluid tight seal. Were the plug in the up limit position, not shown, fluid would flow through passage 30. The main body 14 also contains a drain plug 32. The plug 26 is moved by stem 34 which passes through the upper housing 36 of the valve 10.

The upper housing 36 contains packing 38 and sleeve 40 for guiding the stem 34. The stem 34 continues into the top of the valve 10 called the operator 42. The operator has an operator housing 44. The stem 34 passes through the operator housing 44 to a plate 46. The plate 46 is attached to the operator housing 44 by a diaphragm 48. The diaphragm 48 is flexible to allow the plate 46 to move up and down along with the stem 34 and plug 26. The diaphragm 48 is air-tight. The spring 50 keeps the plate 46, stem 34, plug 26 assembly in the up limit position when no air pressure is applied to the valve. When air of sufficient pressure is applied through line 52 to the operator 42, a force is applied to the top of plate 46 overcoming the opposing force of the spring 50 and driving the plate 46, stem 34, plug 26 assembly down until it is in the down limit position. Valves can also be constructed such that the valve is normally closed, and air pressure opens the valve.

The rest of the permanent valve equipment may be considered an actuator in the form of a solenoid operated valve (SOV) 60. The invention consists of the timing equipment 12 with multiple possible inputs. The first inputs indicate arrival of the signal over line 62 to the actuator and start the timing procedure. Only a single method of indicating arrival of the signal need be employed. However, all suggested methods are shown at once. A coil of wire 68 can be wrapped around the outside of the solenoid 56. The changing electro-magnetic field from the arrival of the activation signal at the solenoid will induce a current in the coil 68, connected to the timing equipment 12 by lines 69. The induced current in the coil 68 indicates to the timing equipment 12 that timing should begin. An accelerometer 70 can be attached to solenoid 56 by magnet 64 and connected to the timing equipment 12 by line 71. The accelerometer senses the vibration of the motion of the solenoid slug. When the slug begins motion, the timing equipment 12 can process the input from the accelerometer 70 to indicate that timing should begin. The timing equipment 12 can also be attached by line 73 to pressure sensor 72. When the SOV 60 opens, air pressure in line 52 will increase. A signal from pressure sensor 72 can be processed by timing device 12 to indicate that timing should begin. The timing device 12 ends timing by reception of information on line 75 from laser motion sensor 74. Laser motion sensor 74 consists of a laser head 76 mounted to the operator housing 44 by attachment means 78. Attachment means 78 could be an adhesive, a plastic tie going around the operator housing 44 or any other convenient means of attachment. The laser head 76 aims a laser beam 80 at a reflecting surface 82. The reflecting surface 82 is attached to the valve stem 34 by support 84. Support 84 can be a test tube clamp or other attachment sufficiently rigid to support the reflecting surface 82. Timing equipment 12 contains processing equipment to support the laser motion sensor 74. When the laser motion sensor 74 indicates that the plug 26 is in the up limit position or the down limit position, the timing equipment 12 stops timing and records the time in memory by display, by printing, or other recording means.

Figure 2:
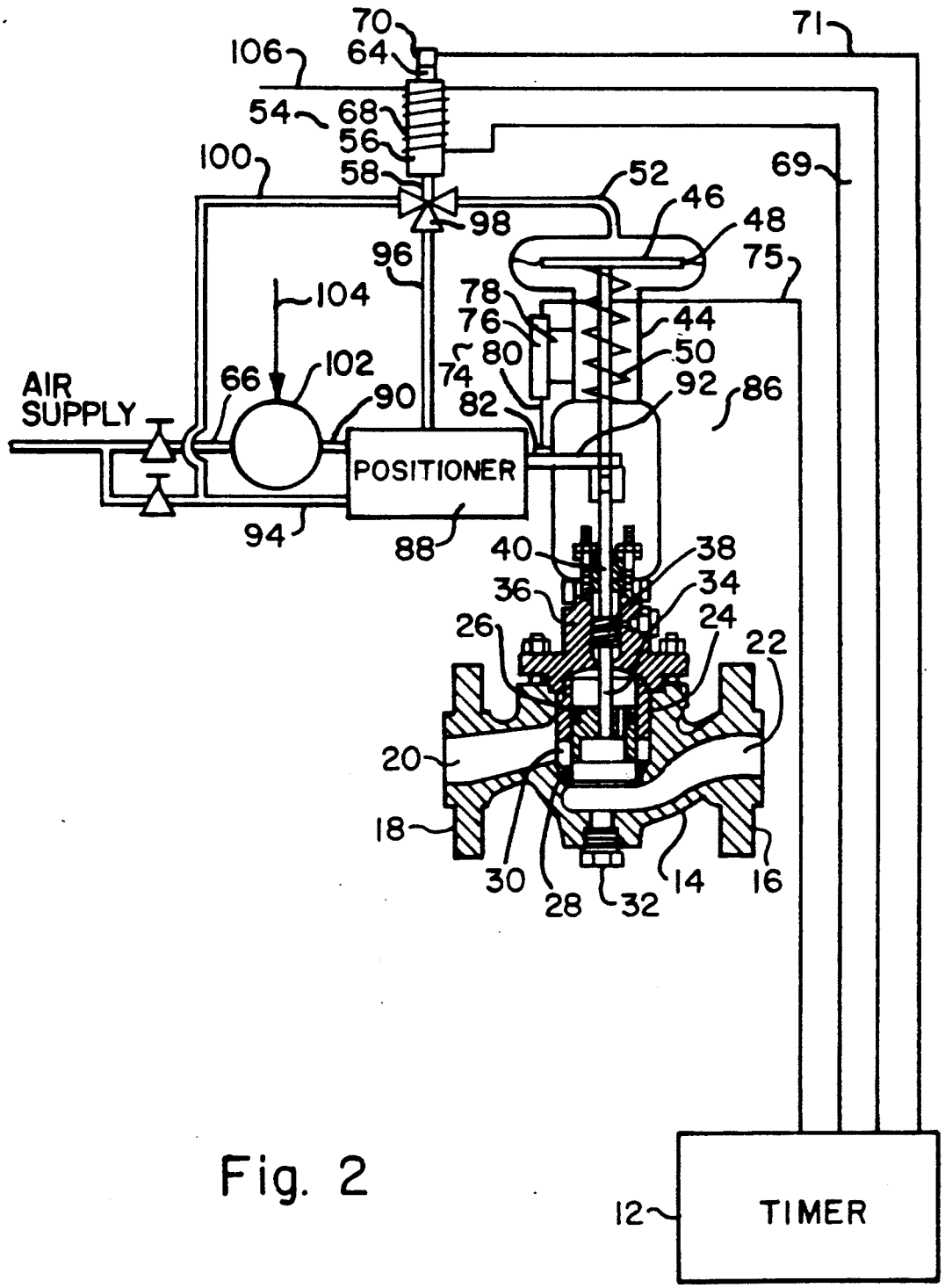
FIG. 2 is a side view partially in section of the timing device attached to a variable position valve.

FIG. 2 shows a partial section drawing of the timing equipment 12 attached to a variable position valve 86. Variable position valve 86 is similar to valve 10 with several additions. The position of plug 26 in sleeve 24 can be controlled so that the plug 26 is in positions other than the up limit position or the down limit position. A positioner 88 is connected by air line 90 to I/P transducer 102. An activation signal on line 104 to the I/P transducer changes the pressure in line 90 to positioner 88. The positioner 88 is attached to stem 34 by arm 92. The positioner 88 determines the position of the plug 26 by sensing the position of stem 34 through arm 92. The positioner 88 compares the air pressure in line 90 from the I/P transducer 102, the full air pressure in line 94 and sends an air pressure signal on line 96 to valve 98. Valve 98 controls the full air pressure in line 100 to the operator 42. By a mechanical feed back loop sensing the position of the arm 92, the full air pressure in line 94 and the air pressure from the I/P transducer 102, the positioner 88 can control the position of the plug in 26 in the valve by adjusting the air pressure in line 96 to valve 98. The timing equipment 12 is connected in the same manner to the variable position valve 86 as to the valve 10. Line 69 connects to a coil 68 on the solenoid 56. Line 71 connects to the accelerometer 70, attached to actuator 54 by magnet 64. Line 75 connects to the laser motion sensor 74. The reflective surface 82 is attached to arm 92. The reflective surface could also be attached to the stem 34 by the method shown in FIG. 1.

The actuation signal to the actuator arrives on line 106. The actuator 54 is set up, when signalled, to override the pressure signal from positioner 88. While a signal on line 104 can fully open or close the valve through the positioner 88, line 106 is a more secure emergency line and acts directly on the actuator 54 for a more direct response.

We claim:

1. A method for timing the full operational motion of a valve plug in an electrically actuated, pneumatically operated valve without intrusion by an electrically conductive connection to a conductor of the electrical actuation signal, comprising:
generating an electrical actuation signal;
electrically conducting the actuation signal to the valve to initiate pneumatically induced movement of the valve plug toward a limit of motion;
non-intrusively sensing arrival of the actuation signal at the valve;
sending a start timing signal to a time measuring device when the actuation signal is sensed;
non-intrusively sensing when the valve plug reaches the limit of motion;
sending an end timing signal to the time measuring device upon sensing that the valve plug has reached the limit of motion;
measuring the time elapsed from the start timing signal to the end timing signal with the time measuring device; and
recording the time elapsed.

2. In a process plant having an electrically actuated, pneumatically operated valve, the combination comprising:
means for generating a valve actuation signal;
an electrical conductor for the valve actuation signal;
means for generating an arrival signal indicative of the arrival of the valve actuation signal at said pneumatically operated valve, without an electrically conductive connection to the electrical conductor of the actuation signal;
means for generating a limit signal indicative of the limit of the valve operation, without applying a force to the valve;
means for measuring the time difference from the arrival signal to the limit signal; and
means for recording the time difference.

3. The combination of claim 2, wherein the electrically actuated, pneumatically operated valve contains a solenoid; and
the means for signalling the arrival of the valve actuation signal at the valve is a coil of wire around the solenoid.

4. The combination of claim 2, where the electrically actuated, pneumatically operated valve contains a solenoid with a solenoid slug; and
the means for generating an arrival signal at the valve is an accelerometer on the solenoid for sensing the motion of the solenoid slug.

5. The combination of claim 2, wherein the electrically actuated, pneumatically operated valve contains a permanent pressure sensor and the means for generating an arrival signal at the valve is the pressure sensor.

6. The combination of claim 2, including a plurality of means for generating an arrival signal at the valve.

7. The combination of claim 2 wherein the means for generating a limit signal indicative of the limit of the valve operation comprises a laser measurement means.

8. The method of claim 1 wherein the sensing of the valve plug reaching a limit of motion places no substantial forces on the valve.

9. The method of claim 1, wherein the electrically actuated, pneumatically operated valve has a solenoid, and a coil of wire around the solenoid senses the arrival of the actuation signal at the valve.

10. The method of claim 1, wherein the electrically actuated, pneumatically operated valve has a solenoid with a solenoid slug, and an accelerometer on the solenoid senses the arrival of the actuation signal at the valve.

11. The method of claim 1, wherein the electrically actuated, pneumatically operated valve contains a permanent pressure sensor, and the pressure sensor senses the arrival of the actuation signal at the valve.

12. The method of claim 1, wherein the electrically actuated pneumatically operated valve contains a plurality of means for sensing arrival of the actuation signal, and the time elapsed is measured from each start timing signal from each of the plurality of means for measuring the arrival of the actuation signal to the end timing signal.

* * * * *